United States Patent
Wengerter et al.

(10) Patent No.: US 8,000,410 B2
(45) Date of Patent: Aug. 16, 2011

(54) BIT RELIABILITY EQUALIZATION BY MODULATION SWITCHING FOR HARQ

(75) Inventors: Christian Wengerter, Kleinheubach (DE); Alexander Golitschek Edler von Elbwart, Darmstadt (DE); Isamu Yoshii, Frankfurt (DE)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 11/913,659

(22) PCT Filed: May 13, 2005

(86) PCT No.: PCT/EP2005/005264
§ 371 (c)(1),
(2), (4) Date: Jun. 25, 2008

(87) PCT Pub. No.: WO2006/119794
PCT Pub. Date: Nov. 16, 2006

(65) Prior Publication Data
US 2008/0260067 A1    Oct. 23, 2008

(51) Int. Cl.
H04L 27/36    (2006.01)
H04L 1/18    (2006.01)
(52) U.S. Cl. ........................................ 375/298; 714/748
(58) Field of Classification Search .......... 375/260–261, 375/265, 298, 316, 358; 370/206, 465; 714/748, 714/751–753
See application file for complete search history.

(56) References Cited

U.S. PATENT DOCUMENTS

| | | | |
|---|---|---|---|
| 7,093,178 B2 * | 8/2006 | Kim et al. | 714/748 |
| 7,280,606 B2 * | 10/2007 | Kim et al. | 375/295 |
| 2003/0007476 A1 | 1/2003 | Kim et al. | |
| 2003/0021240 A1 * | 1/2003 | Moon et al. | 370/320 |
| 2003/0072292 A1 | 4/2003 | Yoon | |
| 2003/0081690 A1 | 5/2003 | Kim | |
| 2003/0097629 A1 | 5/2003 | Moon | |
| 2003/0120990 A1 * | 6/2003 | Elbwart et al. | 714/748 |

(Continued)

FOREIGN PATENT DOCUMENTS

EP    1 313 247    5/2003

(Continued)

OTHER PUBLICATIONS

3GPP TS 25.308 V5.3.0 (Dec. 2002) Technical Specification "3rd Generation Partnership Project; Technical Specification Group Radio Access Network; High Speed Downlink Packet Access (HSDPA); Overall description; Stage 2 (Release 5)," Dec. 2002, pp. 1-29.

(Continued)

*Primary Examiner* — Khanh C Tran
(74) *Attorney, Agent, or Firm* — Dickinson Wright PLLC

(57) ABSTRACT

A method is disclosed for digital data transmission using higher order modulation schemes, wherein a plurality of bits is mapped to bit positions of a symbol and the transmission has different error probabilities for at least two out of said bit positions. A data bit is mapped to a bit position in a first modulation scheme and transmitted in a symbol on the mapped bit position of the first modulation scheme. When a request is received from a receiver, for re-transmission of a data block containing this data bit, a decision is made about a re-transmission of said bit, based on a reliability of the bit position in the first transmission, and if it is decided to retransmit the bit, the data bit is mapped to a bit position of a second modulation scheme and retransmitted in a symbol on the mapped bit position of the second modulation scheme.

16 Claims, 8 Drawing Sheets

U.S. PATENT DOCUMENTS

2007/0030836 A1* 2/2007 Suh et al. .................. 370/338
2008/0101281 A1* 5/2008 Harris et al. ............... 370/328

FOREIGN PATENT DOCUMENTS

| | | |
|---|---|---|
| EP | 1 293 059 | 3/2004 |
| JP | 2003-101520 | 4/2003 |
| JP | 2003-198503 | 7/2003 |
| JP | 2003-229813 | 8/2003 |

OTHER PUBLICATIONS

3GPP TS 25.212 V5.3.0 (Dec. 2002) Technical Specification, "3rd Generation Partnership Project Technical Specification Group Radio Access Network; Multiplexing and channel coding (FDD) (Release 5)," Dec. 2002, pp. 1-74.

3GPP TSGR1#21 R1-01-0780, "Selective Transmission for Partial Soft Combining," TSG-RAN Working Group 1 Meeting #20, Turin, Italy, Jun. 27-Aug. 31, 2001, pp. 1-7.

3GPP TSGR1#20 R1-01-0543, "Partial Chase Combining for Code Management," TSG-RAN Working Group 1 Meeting #21, Busan, Korea, May 21-25, 2001, pp. 1-8.

Wengerter, C, et al., "Advanced Hybrid ARQ Technique Employing a Signal Constellation Rearrangement," IEEE VTC 2002 Fall, Sep. 2002, vol. 4, pp. 2002-2006.

Japanese Notice of Reasons for Rejection dated Oct. 19, 2010.

English translation of Japanese Office Action dated Mar. 1, 2011.

\* cited by examiner bit-mapping order: $i_1 q_1 i_2 q_2 i_3 q_3$
MSBs: $i_1 q_1$
xSBs: $i_2 q_2$
LSBs: $i_3 q_3$ $b_1 \rightarrow i_1$
$b_2 \rightarrow q_1$
$b_3 \rightarrow i_2$
$b_4 \rightarrow q_2$
$b_5 \rightarrow i_3$
$b_6 \rightarrow q_3$

| Symbol ($i_1q_1i_2q_2i_3q_3$) ($b_1b_2b_3b_4b_5b_6$) | Mean value of $x$ | $\rho(b_1=i_1)$ | $\rho(b_3=i_2)$ | $\rho(b_5=i_3)$ |
|---|---|---|---|---|
| $0q_10q_21q_3$ $1q_10q_21q_3$ | $+x_0$ $-x_0$ | ≈ 1.23 | ≈ 4.37 | ≈ 1.17 |
| $0q_10q_20q_3$ $1q_10q_20q_3$ | $+x_1$ $-x_1$ | ≈ 4.38 | ≈ 1.23 | ≈ 1.17 |
| $0q_11q_20q_3$ $1q_11q_20q_3$ | $+x_2$ $-x_2$ | ≈ 9.14 | ≈ 1.22 | ≈ 1.23 |
| $0q_11q_21q_3$ $1q_11q_21q_3$ | $+x_3$ $-x_3$ | ≈ 15.57 | ≈ 4.12 | ≈ 0.90 |
| Average over all symbols | | ≈ 7.58 | ≈ 2.74 | ≈ 1.12 |

Mapping 1 (bit-mapping order: $i_1q_1i_2q_2$)

$b_5 \rightarrow i_1$
$b_6 \rightarrow q_1$
$b_3 \rightarrow i_2$
$b_4 \rightarrow q_2$

| Symbol $(i_1q_1i_2q_2)$ $(b_5b_6b_3b_4)$ | Mean value of $x$ | $\rho(i_1)$ | $\rho(i_2)$ |
|---|---|---|---|
| $0q_10q_2$ $1q_10q_2$ | $+x_0$ $-x_0$ | $\approx 1.27$ | $\approx 1.27$ |
| $0q_11q_2$ $1q_11q_2$ | $+x_1$ $-x_1$ | $\approx 4.32$ | $\approx 0.96$ |
| Average over all symbols | | $\approx 2.80$ | $\approx 1.12$ |

Fig. 6

| Symbol $(b_1b_2b_3b_4b_5b_6)$ | Mean value of $x$ | $\rho(i_1)$ | $\rho(i_2)$ | $\rho(i_3)$ |
|---|---|---|---|---|
| $0b_20b_41b_6$ $1b_20b_41b_6$ | $+x_0$ $-x_0$ | $\approx 1.23$ | $\approx 5.64$ | $\approx 2.44$ |
| $0b_20b_40b_6$ $1b_20b_40b_6$ | $+x_1$ $-x_1$ | $\approx 4.38$ | $\approx 2.50$ | $\approx 2.44$ |
| $0b_21b_40b_6$ $1b_21b_40b_6$ | $+x_2$ $-x_2$ | $\approx 9.14$ | $\approx 2.18$ | $\approx 5.55$ |
| $0b_21b_41b_6$ $1b_21b_41b_6$ | $+x_3$ $-x_3$ | $\approx 15.57$ | $\approx 5.08$ | $\approx 5.22$ |
| Average over all symbols (per bit position) | | $\approx 7.58$ | $\approx 3.85$ | $\approx 3.91$ |
| Average over all symbols | | $\approx 5.11$ | | |
| STD of all values | | $\approx 3.86$ | | |
| Bit reliabilites < 2 | | 1 | | |

Fig. 7

| Symbol $(i_1q_1i_2q_2i_3q_3)$ $(b_1b_2b_3b_4b_5b_6)$ | Mean value of $x$ | $\rho(i_1)$ | $\rho(i_2)$ | $\rho(i_3)$ |
|---|---|---|---|---|
| $0q_10q_21q_3$ $1q_10q_21q_3$ | $+x_0$ $-x_0$ | $\approx 1.79$ | $\approx 5.91$ | $\approx 1.31$ |
| $0q_10q_20q_3$ $1q_10q_20q_3$ | $+x_1$ $-x_1$ | $\approx 6.11$ | $\approx 1.88$ | $\approx 1.39$ |
| $0q_11q_20q_3$ $1q_11q_20q_3$ | $+x_2$ $-x_2$ | $\approx 12.18$ | $\approx 1.53$ | $\approx 1.57$ |
| $0q_11q_21q_3$ $1q_11q_21q_3$ | $+x_3$ $-x_3$ | $\approx 20.10$ | $\approx 5.35$ | $\approx 0.93$ |
| Average over all symbols | | $\approx 10.05$ | $\approx 3.67$ | $\approx 1.3$ |
| Average over all symbols | | $\approx 5.00$ | | |
| STD of all values | | $\approx 5.67$ | | |
| Bit reliabilites < 2 | | 7 | | |

Fig. 8

$b_6 \rightarrow i_1$
$b_5 \rightarrow q_1$
$b_3 \rightarrow i_2$
$b_4 \rightarrow q_2$

Fig. 9

$b_5 \rightarrow i_1$
$b_6 \rightarrow q_1$
$b_4 \rightarrow i_2$
$b_3 \rightarrow q_2$

Fig. 10

$b_6 \rightarrow i_1$
$b_5 \rightarrow q_1$
$b_4 \rightarrow i_2$
$b_3 \rightarrow q_2$

Fig. 11

Bit reliability $b_3$

According to rule (3)

| 64-QAM | $b_3=0$ | $b_3=1$ |
|---|---|---|
| $b_5=0$ | 1.23 | 1.22 |
| $b_5=1$ | 4.37 | 4.12 |

A

| 16-QAM | $b_3=0$ | $b_3=1$ |
|---|---|---|
| $b_5=0$ | 1.27 | 0.96 |
| $b_5=1$ | 1.27 | 0.96 |

B

| Combined | $b_3=0$ | $b_3=1$ |
|---|---|---|
| $b_5=0$ | 2.5 | 2.18 |
| $b_5=1$ | 5.64 | 5.08 |

C

Contrary to rule (3)

| 64-QAM | $b_3=0$ | $b_3=1$ |
|---|---|---|
| $b_5=0$ | 1.23 | 1.22 |
| $b_5=1$ | 4.37 | 4.12 |

D

| 16-QAM | $b_3=0$ | $b_3=1$ |
|---|---|---|
| $b_5=0$ | 0.96 | 1.27 |
| $b_5=1$ | 0.96 | 1.27 |

E

| Combined | $b_3=0$ | $b_3=1$ |
|---|---|---|
| $b_5=0$ | 2.19 | 2.49 |
| $b_5=1$ | 5.33 | 5.49 |

Bit reliability $b_5$

According to rule (3)

| 64-QAM | $b_3=0$ | $b_3=1$ |
|---|---|---|
| $b_5=0$ | 1.17 | 1.23 |
| $b_5=1$ | 1.17 | 0.90 |

G

| 16-QAM | $b_3=0$ | $b_3=1$ |
|---|---|---|
| $b_5=0$ | 1.27 | 4.32 |
| $b_5=1$ | 1.27 | 4.32 |

H

| Combined | $b_3=0$ | $b_3=1$ |
|---|---|---|
| $b_5=0$ | 2.44 | 5.55 |
| $b_5=1$ | 2.44 | 5.22 |

J

Contrary to rule (3)

| 64-QAM | $b_3=0$ | $b_3=1$ |
|---|---|---|
| $b_5=0$ | 1.17 | 1.23 |
| $b_5=1$ | 1.17 | 0.90 |

K

| 16-QAM | $b_3=0$ | $b_3=1$ |
|---|---|---|
| $b_5=0$ | 4.32 | 1.27 |
| $b_5=1$ | 4.32 | 1.27 |

L

| Combined | $b_3=0$ | $b_3=1$ |
|---|---|---|
| $b_5=0$ | 5.49 | 2.5 |
| $b_5=1$ | 5.49 | 2.17 |

M

BIT RELIABILITY EQUALIZATION BY MODULATION SWITCHING FOR HARQ

BACKGROUND OF THE INVENTION

1. Field of the Invention

The invention relates to communication of data between a transmitter and a receiver. It is particularly applicable to communication systems where the data is transmitted over a time-variant or frequency-variant channel, such as in mobile communication systems or satellite communication.

2. Description of the Related Art

This invention addresses the bit to symbol mapping for higher order modulation schemes when the modulation scheme is switched between ARQ (re)transmissions, e.g. in a system employing link adaptation by Adaptive Modulation and Coding (AMC) as it is used e.g. in 3GPP HSDPA.

In higher order modulation schemes, a plurality of bits $b_1, \ldots, b_i, \ldots, b_n$ (generally n>2) is mapped onto one symbol. This plurality of bits can be expressed as a binary word (or vector of bits) $b_1 \ldots b_i \ldots b_n$, wherein to each value of this word or vector a certain modulation state is assigned. This assignment is called the "mapping" of bits to symbols. The order number i specifies the position of a certain bit (digit) within this word or vector and is hence called the "bit position".

For a detailed explanation of AMC, please refer to 3GPP, Technical Specification 25.308, "High Speed Downlink Packet Access (HSDPA)", Overall description, Stage 2, v. 5.3.0, December 2002 and A. Burr, "Modulation and Coding for Wireless Communications", Pearson Education, Prentice Hall, ISBN 0 201 39857 5, 2001.

More information about HSDPA in general is available from 3GPP TS 25.308, cited above, and from 3GPP, Technical specification 25.212; "Multiplexing and Channel Coding (FDD)", v. 5.3.0, December 2002.

In European Patent Specification EP1293059B1 it has been shown that the bit to symbol mapping for ARQ can be tailored in order to improve the ARQ performance. EP1293059B1 discloses a method changing the bit to symbol mapping over retransmissions in order to equalize the bit reliabilities over retransmissions. However, EP1293059B1 provides only a solution for cases in which the same modulation scheme is used in the ARQ transmissions.

For systems employing AMC, switching of the modulation scheme between ARQ (re)transmissions may be useful, especially if the (re)transmissions are transmitted with different power levels or received at different SIR levels (e.g. due to channel state variations).

In US Patent Application US 2003021240A1 and in "Selective Retransmission for Partial Soft Combining", 3GPP TSGR1#21, R1-01-0780, Turin, Italy, Jun. 27-Aug. 31, 2001, a scheme has been proposed, where the bits which are retransmitted with a different modulation scheme are selected according to their content (systematic or parity bit).

There is no solution available for controlling or equalizing the bit reliabilities over retransmissions when switching the modulation scheme.

For simplicity, the description focuses in the following on the initial transmission of a packet/symbol and the first retransmission of a packet/symbol. Moreover, without loss of generality it is assumed that for the retransmission a lower order modulation scheme (less bits per symbol) is used than in the initial transmission. (In other examples, the opposite may be the case, for example if the re-transmission is to comprise additional redundancy data.) For a typical system (e.g. 3GPP HSDPA), re-transmission with lower order modulation scheme means that the first retransmission carries fewer bits than the initial transmission, since the number of symbols transmitted per transmission attempt is constant. Additionally for simplicity, Partial Chase Combining as described in "Partial Chase Combining For Code Management", 3GPP TSGR1#20, R1-01-0543, Busan, Korea, May 21-25, 2001, is assumed, i.e. the retransmission carries only bits, which have been transmitted in the initial transmission (no additional redundancy). This allows achieving diversity combining gain at the receiver by soft combining of the received data, e.g. by Log Likelihood Ratio (LLR) combining.

It has been shown in EP1293059B1 and in Ch. Wengerter, A. Golitschek Edler von Elbwart, E. Seidel, G. Velev, M. P. Schmitt, "Advanced hybrid ARQ technique employing a signal constellation rearrangement," IEEE VTC 2002 Fall, vol. 4, pp. 2002 2006, 2002, that a reduction in bit reliability variations improves the decoding performance. For the assumptions given above, the following two issues for the transmission mode need to be solved in order achieve a small bit reliability variation and, therefore, a good decoding performance:

1. Selection of the bits for retransmission, i.e. which of the bits of the initial transmission should be retransmitted;
2. Selection of signal constellations and bit mappings (bit to symbol mapping) rules for initial transmission and retransmission.

As mentioned in the previous section, solutions for the first issue have been e.g. discussed for 3GPP HSDPA, where the bits for the retransmissions are selected based on their content (systemic bit or parity bit). In US 2003021240A1 and 3GPP TSGR1#21, cited above, a proposal for preferring the systematic bits is shown. The current specification (see 3GPP TS 25.212, cited above) supports either preferring systematic bits or parity bits depending on a parameter (redundancy version).

Issue 2 is not applicable to prior art systems (e.g. 3GPP2 HDR, 3GPP HSDPA):

In 3GPP2, switching between modulation schemes between retransmissions is not considered.

In 3GPP HSDPA, for the given assumption (retransmission uses a lower modulation scheme than initial transmission) switching is possible from 16 QAM to QPSK. In this case, a selection of the QPSK mapping is not possible, since only a single QPSK mapping is defined. Moreover, the typically used Gray QPSK mappings have identical bit-reliability properties in all bit-positions (all bits have equal bit reliabilities). Therefore, the choice of the QPSK mapping does not have an impact on the bit reliability variation after combining and no impact on the decoding performance.

SUMMARY OF THE INVENTION

It is an object of the present invention to equalize the combined reliabilities of bits when ARQ is applied. It is another object of the present invention to improve the performance of state of the art detection and decoding methods.

This object is achieved by a method and a system in which a decision about a retransmission is made depending on the reliability of a bit position to which a bit had been mapped in an initial (first) transmission.

In one preferred embodiment, bits which have been mapped in the initial transmission to bit positions with relatively lower reliability, are mapped in the retransmission to bit positions with relatively higher reliability and bits which have been mapped in the initial transmission to bit positions with relatively higher reliability are mapped in the retransmission to bit positions with relatively lower reliability.

In another preferred embodiment, the mappings are determined such that a value of a bit, having one value for all modulation states of the outermost half of all rows or columns in the mapping of the first modulation scheme, in these rows or columns is the same as a value of a bit, having one value for all modulation states of the outermost half of all rows or columns in the mapping of the second modulation scheme, in these rows or columns.

According to a first aspect of the present invention, a method for digital data transmission using higher order modulation schemes, wherein a plurality of bits is mapped to bit positions of a symbol and the transmission has different error probabilities for at least two out of said bit positions, comprises the steps of: a) mapping a data bit to a bit position in a first modulation scheme; b) transmitting the data bit in a symbol on the mapped bit position of said first modulation scheme; c) receiving from a receiver a request for retransmission of a data block containing said data bit; d) deciding about a re-transmission of said bit, based on a reliability of said bit position; e) if it is decided in step d) to retransmit said bit, mapping the data bit to a bit position of a second modulation scheme; and f) retransmitting said data bit in a symbol on the mapped bit position of said second modulation scheme.

According to another aspect of the present invention, a computer-readable storage medium has stored thereon instructions which, when executed on a processor of a digital data transmitter, cause the transmitter to perform a method for digital data transmission using higher order modulation schemes, wherein a plurality of bits is mapped to bit positions of a symbol and the transmission has different error probabilities for at least two out of said bit positions, the method comprising the steps of: a) mapping a data bit to a bit position in a first modulation scheme; b) transmitting the data bit in a symbol on the mapped bit position of said first modulation scheme; c) receiving from a receiver a request for retransmission of a data block containing said data bit; d) deciding about a re-transmission of said bit, based on a reliability of said bit position; e) if it is decided in step d) to retransmit said bit, mapping the data bit to a bit position of a second modulation scheme; and f) retransmitting said data bit in a symbol on the mapped bit position of said second modulation scheme.

According to a further aspect of the present invention, a transmitter for a digital communication system using higher order modulation schemes, wherein a plurality of bits is mapped to bit positions of a symbol and the transmission has different error probabilities for at least two out of said bit positions, comprises: a mapper configured to map a data bit to a bit position in a first modulation scheme; a modulator configured to transmit the data bit in a symbol on the mapped bit position of said first scheme; means for receiving from a receiver a request for retransmission of a data block containing said data bit; and decision means configured to decide about a retransmission of said bit, based on a reliability of said bit position, wherein said mapper is further configured to map said data bit, in the case that said decision means has decided that it is to be re-transmitted, to a bit position in a second modulation scheme; and said modulator is further configured to retransmit said data bit, in the case that said decision means has decided that it is to be re-transmitted, in a symbol on the mapped bit position of said second modulation scheme.

According to still another aspect of the present invention, a base station for a mobile communication system comprises a transmitter for a digital communication system using higher order modulation schemes, wherein a plurality of bits is mapped to bit positions of a symbol and the transmission has different error probabilities for at least two out of said bit positions, the transmitter comprising: a mapper configured to map a data bit to a bit position in a first modulation scheme; a modulator configured to transmit the data bit in a symbol on the mapped bit position of said first scheme; means for receiving from a receiver a request for retransmission of a data block containing said data bit; and decision means configured to decide about a retransmission of said bit, based on a reliability of said bit position, wherein said mapper is further configured to map said data bit, in the case that said decision means has decided that it is to be re-transmitted, to a bit position in a second modulation scheme; and said modulator is further configured to retransmit said data bit, in the case that said decision means has decided that it is to be re-transmitted, in a symbol on the mapped bit position of said second modulation scheme.

According to still a further aspect of the present invention, a mobile station for a mobile communication system comprises a transmitter for a digital communication system using higher order modulation schemes, wherein a plurality of bits is mapped to bit positions of a symbol and the transmission has different error probabilities for at least two out of said bit positions, the transmitter comprising: a mapper configured to map a data bit to a bit position in a first modulation scheme; a modulator configured to transmit the data bit in a symbol on the mapped bit position of said first scheme; means for receiving from a receiver a request for retransmission of a data block containing said data bit; and decision means configured to decide about a retransmission of said bit, based on a reliability of said bit position, wherein said mapper is further configured to map said data bit, in the case that said decision means has decided that it is to be re-transmitted, to a bit position in a second modulation scheme; and said modulator is further configured to retransmit said data bit, in the case that said decision means has decided that it is to be re-transmitted, in a symbol on the mapped bit position of said second modulation scheme.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein

FIG. 6 illustrates Bit reliabilities at a SNR of 4 dB for the bits mapped onto a 16-QAM signal constellation according to FIG. 3 and FIG. 4;

FIG. 7 shows Bit reliabilities after combining of initial 64-QAM transmission (according to FIG. 1 and FIG. 2) and 16-QAM retransmission (according to FIG. 3 and FIG. 4);

FIG. 8 shows Bit reliabilities after combining of initial 64-QAM transmission and 64-QAM retransmission (mappings according to FIG. 1) (prior art);

FIGS. 9-11 illustrate alternative examples of 16-QAM bit to symbol mapping;

FIG. 12 illustrates bit reliabilities of combined bits in detail;

DETAILED DESCRIPTION OF THE INVENTION

The illustrative embodiments of the present invention will be described with reference to the figure drawings, wherein like elements and structures are indicated by like reference numbers.

In the following, the idea of the invention is shown for an example when the initial transmission is performed using 64-QAM and the retransmission is performed with 16-QAM. However, these examples are merely given for illustrating the present invention, and are not to be construed as limiting the invention.

Figures 1, 2:
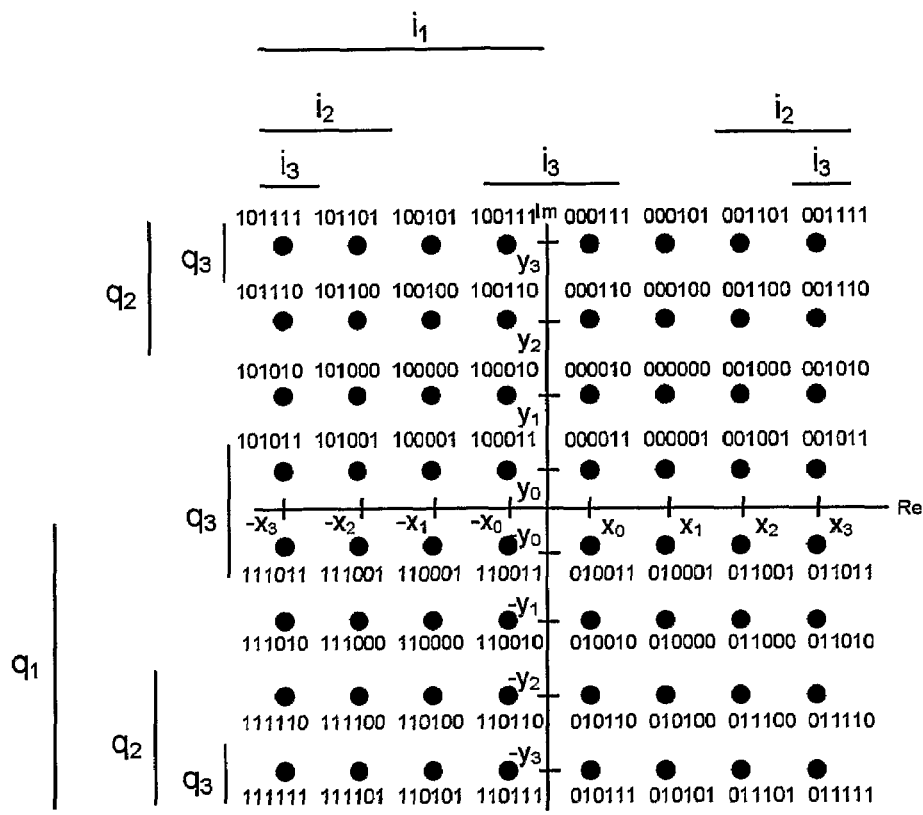
FIG. 1 shows a 64-QAM signal constellation with Gray mapping.
FIG. 2 illustrates an example of 64-QAM bit to symbol mapping.

FIG. 1 shows a commonly used 64-QAM signal constellation with a Gray mapping. Six bits are mapped onto the bit positions $(i_1 q_1 i_2 q_2 i_3 q_3)$ of one modulation symbol, where the i-bit positions denote the in phase component bits and the q-bit positions denote the quadrature phase component bits. The reliability of the bits depends on the mapping (or on the bit position MSB, xSB, LSB) and on the transmitted bit value. This will be shown in the following for the i-bit positions (properties and conclusions are analogue for the q-bit positions).

The Log Likelihood Ratio LLR is a probability metric for the demodulated bit b in a received modulation symbol $r=x+jy$ and is generally defined as follows (see A. Burr, cited above, S. Le Goff, A. Glavieux, C. Berrou, "Turbo-codes and high spectral efficiency modulation, IEEE SUPERCOMM/ICC '94, vol. 2, pp. 645-649, 1994, and R. Pyndiah, A. Picart, A. Glavieux, "Performance of block Turbo coded 16-QAM and 64-QAM modulations," IEEE GLOBECOM '95, vol. 2, pp. 1039 1043, 1995):

$$LLR(b) = \ln\left[\frac{Pr\{b=1 \mid r\}}{Pr\{b=0 \mid r\}}\right] \quad (1)$$

Therefore, the sign of the LLR can be interpreted as a hard decision $\beta(b)$ for the most likely bit value b given the received symbol r. Likewise the absolute value of the LLR can be interpreted as a bit reliability $\rho(b)$ for said hard decision:

$$\beta(b) = sgn[LLR(b)] \quad (2)$$

$$\rho(b) = |LLR(b)| \quad (3)$$

The Log Likelihood Ratio LLR of the bits $i_1$, $i_2$ and $i_3$ yield the following equations for a Gaussian channel and a 64-QAM with a signal constellation and mapping according to FIG. 1 and FIG. 2 respectively:

$$LLR(b_1 = i_1) = \ln\left[\frac{e^{-K(x+x_0)^2} + e^{-K(x+x_1)^2} + e^{-K(x+x_2)^2} + e^{-K(x+x_3)^2} +}{e^{-K(x-x_0)^2} + e^{-K(x-x_1)^2} + e^{-K(x-x_2)^2} + e^{-K(x-x_3)^2}}\right] \quad (4)$$

$$LLR(b_3 = i_2) = \ln\left[\frac{e^{-K(x-x_2)^2} + e^{-K(x-x_3)^2} + e^{-K(x+x_2)^2} + e^{-K(x+x_3)^2}}{e^{-K(x-x_0)^2} + e^{-K(x-x_1)^2} + e^{-K(x+x_0)^2} + e^{-K(x+x_1)^2}}\right] \quad (5)$$

$$LLR(b_5 = i_3) = \ln\left[\frac{e^{-K(x-x_0)^2} + e^{-K(x-x_3)^2} + e^{-K(x+x_0)^2} + e^{-K(x+x_3)^2}}{e^{-K(x-x_1)^2} + e^{-K(x-x_2)^2} + e^{-K(x+x_1)^2} + e^{-K(x+x_2)^2}}\right] \quad (6)$$

where x denotes the in phase component of the normalized received modulation symbol r and K is a factor proportional to the signal to noise ratio.

For a Gaussian channel and perfect channel equalization, the mean received modulation symbol r is equal to the constellation point of the transmitted symbol (noise has a zero mean value). Hence, the mean received in-phase components yield $\pm x_0$, $\pm x_1$, $\pm x_2$ and $\pm x_3$ depending on the transmitted modulation symbol. Consequently, for a uniform signal constellation (equidistant constellation points with $|x_i - x_{i-1}| = 2 x_0$) and a SNR=10 dB application of equations (4), (5) and (6) yields the bit reliability values $\rho$ for $i_1$, $i_2$ and $i_3$, i.e. $b_1$, $b_3$ and $b_5$, as given in FIG. 3.

Figures 3, 4, 5:
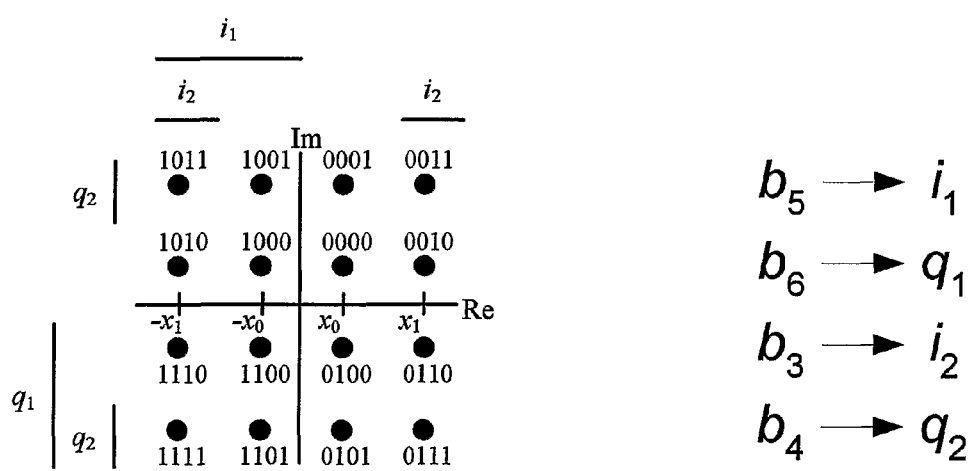
FIG. 3 illustrates Bit reliabilities at a SNR of 10 dB for the bits mapped onto a 64-QAM signal constellation according to FIG. 1 and FIG. 2.
FIG. 4 depicts a 16-QAM signal constellation with Gray mapping.
FIG. 5 illustrates an example of 16-QAM bit to symbol mapping.

FIG. 3 shows that the bit reliabilities for a single transmission depend on the bit position ($i_1$, $i_2$, $i_3$) and on the actually transmitted modulation symbol, which in turn depends on the bit value. E.g. $i_2$ is most reliable ($\rho(b_3=i_2)=4.37$) for the transmitted symbols $0q_1 0q_2 1q_3$ (which means $i_1=i_2=0$ and $i_3=1$ and $q_n$ arbitrary) and $1q_1 0q_2 1q_3$ ($x=\pm x_0$) and is least reliable ($\rho(b_3=i_2)=1.22$) for the transmitted symbols $0q_1 1q_2 0q_3$ and $1q_1 1q_2 0q_3$ ($x=\pm x_1 \vee x=\pm x_2$). Moreover, the average reliability of the bit positions $i_1$, $i_2$ and $i_3$ is 7.58, 2.74 and 1.12 respectively, i.e. on average $i_1$ is significantly more reliable than $i_2$, which is on average more reliable than $i_3$. However, for some modulation symbols (e.g. $0q_1 1q_2 0q_3$) $i_2$ and $i_3$ are almost equally reliable.

In case a series of six bits $b_1$ to $b_6$ is mapped onto a 64-QAM symbol, the average reliability for each bit can be controlled by the bit-to-symbol mapping. E.g. in case $b_1$ and $b_2$ should be more reliable than $b_3$ and $b_4$, which should be more reliable than $b_5$ and $b_6$, the mapping according to FIG. 2 could be applied. Note, that only the average reliability per bit $b_n$ can be controlled by the bit-to-symbol mapping, since the variations of the bit reliability within a bit position depend on the actually transmitted data (bit values, modulation symbols).

In case an ARQ protocol is employed, the retransmissions can be used in order to modify the bit reliability distribution characteristics. This has been shown in EP1293059B1, when the same modulation scheme is kept over retransmissions. The present invention uses a scheme for modifying the bit reliability distribution (reducing the variations), when the modulation scheme is switched over retransmissions.

The following three rules represent different levels of improvement. It is assumed that with each rule, all preceding rules are implemented at the same time. The signal constellation of the initial (first) transmission is shown in FIG. 1 and the assignment of bits to bit positions is shown in FIG. 2.

(1) The most reliable bits from the initial transmission ($b_1$ and $b_2$) are not retransmitted.

(2) The least reliable bits from the initial transmission ($b_5$ and $b_6$) are mapped onto the high reliable positions ($i_1$ and $q_1$) in the 16-QAM retransmission and the bits with intermediate reliability ($b_3$ and $b_4$) are mapped onto the low reliable positions ($i_2$ and $q_2$) in the 16-QAM retransmission.

(3) If the mapping of the initial transmission is such that certain bits (here $b_3$ and $b_4$) have one common value each for all modulation states in the outermost half of all (i.e. here: four) columns/rows ($i_2$ and $q_2$ positions of 64-QAM), the mapping for the retransmission should be such that each of these bits has this respective same value for all modulation states within the outermost half (i.e. here: two) of the columns/rows in the 16-QAM retransmission ($i_2$ and $q_2$ positions of 16-QAM). In this context it is not relevant whether the common value is zero or one, as long as it is the same in initial transmission and retransmission. Furthermore the meaning of rows and columns can be exchanged between initial transmission and retransmission, as this means only a constant phase difference without impact on reliabilities. Therefore mappings according to FIGS. 9-11 may be used instead of the mapping of FIG. 5.

Excluding the bits transmitted on the most reliable positions in the first transmission reduces the traffic load on the transmission channel while maintaining a reasonable reliability of all bits. In particular, the combined reliability of retransmitted bits is in average similar to the reliability of bits which are not retransmitted but transmitted on the most reliable bit positions in the initial transmission.

The number of bit positions in the first transmission, which are not categorized as most reliable, may not always be equal to the number of bit positions available for retransmission. In the case that more bit positions are available for retransmission than bit positions exist in the initial transmission which are not most reliable, some of the bits mapped to most reliable bit positions in the initial transmission may be retransmitted as well. On the other hand, if the number of bit positions in the retransmission is lower than the number of bit positions of the first transmission, which are not most reliable, some bits may not be retransmitted although they have not been transmitted on one of the most reliable bit positions in the original transmission. In any case, bits which had been mapped to bit positions with relatively lower reliability in the initial transmission should preferentially be retransmitted. "Preferentially" in this context means "as far as positions are available". That is, the decision should be made such that retransmitted bits should not have been initially transmitted on bit positions with higher reliability than those bits which are not retransmitted.

In one alternative, a second modulation scheme with lower order than that of the first modulation scheme used for the initial transmission may be applied for the retransmission. If the signal to noise ratio is adjusted such that the bit reliabilities are similar to those of the first modulation scheme, transmission power and consequently interference to other channels is reduced. In CDMA systems this means more efficient use of the total available transmission capacity. Alternatively the same signal power may be maintained to improve the reliability of the retransmission.

In another alternative, the second modulation scheme may have the same or even higher order. This would allow to transmit additional redundancy or control information instead of the bits which need not be retransmitted. Instead of transmitting additional information, the block length may alternatively reduced for retransmission or retransmitted data from more than one transmission block may be combined into one retransmission block.

Rule (2) further reduces the standard deviation of all reliabilities, as differences from the first (initial) transmission are reduced by the complementary mapping regarding reliability in the retransmission.

Also here, the division into bit positions with medium reliability and bit positions with low reliability with the initial transmission may not match the division into bit positions with high reliability and bit positions with low reliability in the retransmission. In any case, bits which had been mapped to bit positions with relatively higher reliability in the initial transmission should preferentially be mapped to bit positions with relatively lower reliability in the retransmission, and vice versa. "Preferentially" in this context means "as far as positions are available". That is, for any pair of bits $b_1$ and $b_2$, $b_2$ should be mapped in the retransmission to a bit position with equal or higher reliability than that of a bit position to which $b_1$ is mapped in the retransmission, if $b_2$ had been mapped to a bit positions with lower reliability than that of a bit position to which be had been mapped in the initial transmission. Mathematically speaking, the reliabilities of bit positions to which bits are mapped in the retransmission, plotted over the reliabilities of bit positions to which the respective bits had been mapped in the initial transmission, should yield a monotonously falling function if plotted for all retransmitted bits.

Assuming a signal constellation and bit-to-symbol mapping according to FIG. 2 and a 16-QAM retransmission, the proposed scheme yields a signal constellation according to FIG. 4 and a bit mapping according to FIG. 5 when all three rules are applied. It should be noted that the figures just show the relationship of bit positions to which bits are mapped in initial transmission and retransmission. This is not restricted to a case in which all bits transmitted in one retransmission symbol have been transmitted in the same symbol of the initial transmission.

In the following, a LLR analysis is provided in order to show the benefits of the disclosed scheme over prior art Chase Combining, where the first retransmission is carried out with 64-QAM and the identical signal constellation (FIG. 1) and identical bit to symbol mapping (FIG. 2) as in the initial transmission. As introduced above, it is assumed that the retransmission is transmitted/received with less power than the initial transmission. The following examples assume a SNR of 10 dB for the initial transmission and a SNR of 4 dB (6 dB offset) for the first retransmission.

FIG. 6 shows the bit reliabilities for the first retransmission according to the method described herein, employing the 16-QAM signal constellation according to FIG. 4 and the bit to symbol mapping according to FIG. 5. In case the initial transmission fails and a retransmission is requested, the soft combination of the LLRs at the receiver of the initial 64-QAM transmission and the 16-QAM retransmission yields the bit reliabilities as shown in FIG. 7. The average reliability is equal to 5.11, the standard deviation (STD) is equal to 3.86, and 8.33% (1 out of 12) of the bits are very unreliable (bit reliability smaller than 2.00).

FIG. 8 shows the bit reliabilities of prior art after the first retransmission, when the initial transmission and the first retransmission are carried out with identical signal constellations and bit mappings. The average reliability is equal to 5.00, the STD is equal to 5.67, and 58.33% (7 out of 12) of the bits are very unreliable (bit reliability smaller than 2.00).

FIGS. 12 A-M further illustrate the benefit of rule (3) if implemented in addition to the first two rules. FIG. 12 A shows the reliabilities of bits $b_3$ and $b_5$ in the 64-QAM according to FIGS. 2 and 3, depending on their own values. FIG. 12 B shows the reliabilities of the retransmission of the same bits following the given rule, i.e. according to FIGS. 4 and 5. FIG. 12 C lists the combined reliabilities of transmission and retransmission. For comparison, FIGS. 12 D-F show the respective reliabilities for an opposite assignment of $b_3$ in the 16-QAM ($b_3=0$ for the two outer columns). A comparison between FIGS. 12 C and 12 F does not show significant differences for $b_3$. However, FIGS. 12 G-M show that the worst combined reliability for $b_5$ is 2.44 if the given rule is followed and 2.17 in the opposite case. This improvement reduces block error rate and therefore improves the total system performance significantly. The disclosed scheme achieves a larger bit reliability, a smaller STD and has less unreliable bits, which leads to an improvement in decoding performance.

In this context it should be noted that rules (2) and (3) may be fulfilled by selecting appropriate mappings of bits to bit positions. The same effect is, however, also achieved by selecting an appropriate combination of a mapping of bits to bit positions of symbols and a mapping of symbols to modulation states. Even any mapping of bits to bit positions of a Gray mapping may be chosen in connection with an appropriate preceding bit manipulation in the transmitter, i.e. exchanging and/or inverting of predetermined bits, and a complementary bit manipulation in the receiver. Such methods are for example disclosed in WO 03043261. Any combination of mappings and operations which results in the relationship between bits and modulation states as described above may be regarded as one overall mapping of bits to bit positions of a modulation scheme, and is intended to be included within the scope of the present invention.

The disclosed scheme achieves a larger average bit reliability, a smaller STD and has less unreliable bits, which leads to an improvement in decoding performance.

Figure 13:
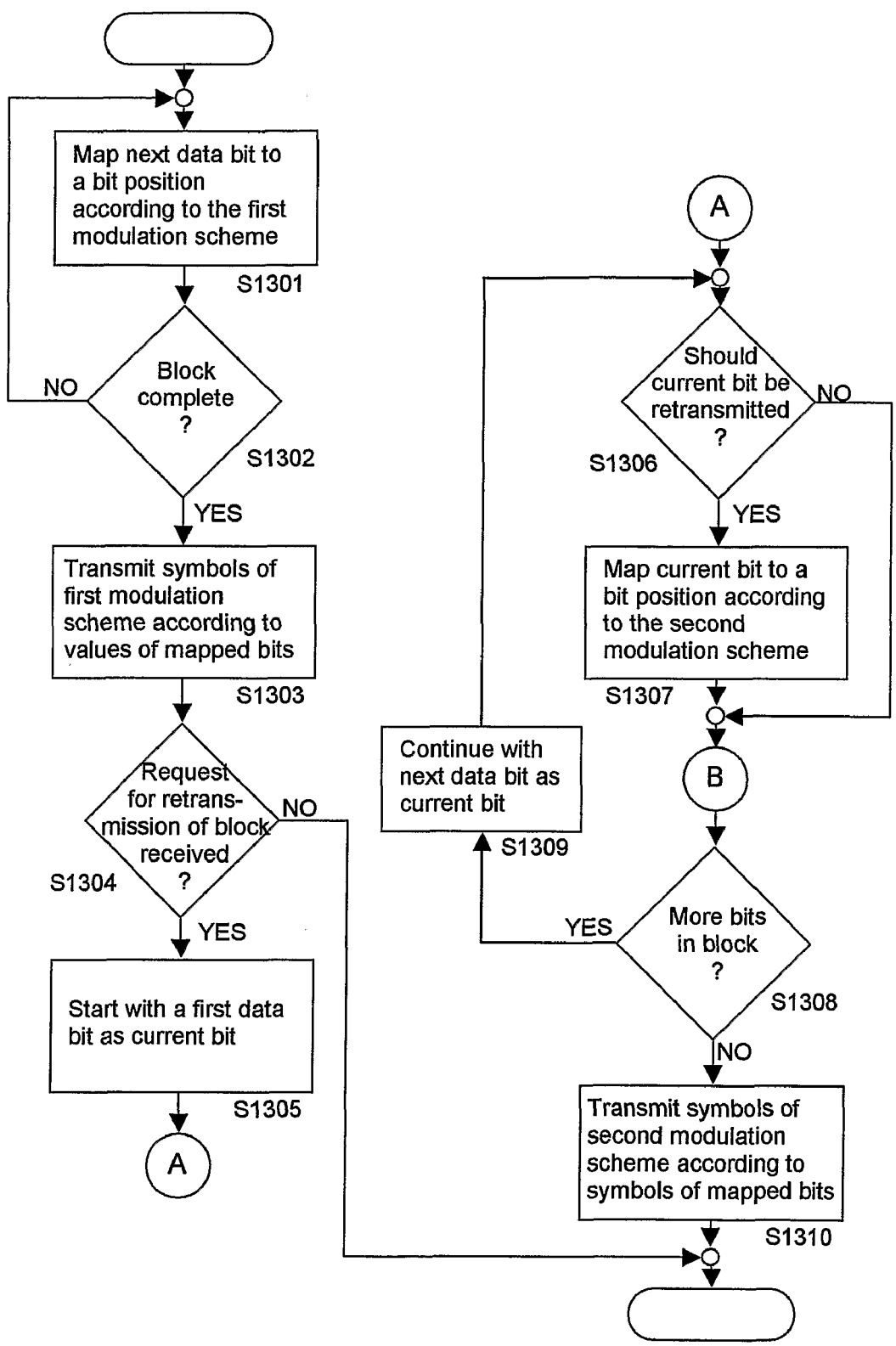
FIG. 13 depicts a flow chart giving an overview over the described method.

The basic steps of the described method are illustrated in FIG. 13. It should be understood that these steps may be repeated as long as data is available for transmission. Further it is assumed that data is transmitted and retransmitted in units of blocks.

In S1301, a current data bit is mapped to a certain bit position according to a first modulation scheme. The modulation scheme and the applied mapping may be defined in a standard and be represented by constant values stored in the transmitter. Alternatively they may be negotiated with the receiver or selected from a given set of possibilities according to preferences of transmitter and receiver and according to conditions of the transmission path.

In S1302 it is queried whether a transmission block is complete. If this is not the case, more data bits are mapped. If the data block is complete, the data is transmitted in S1303 in symbols according to the first modulation scheme and according to the bit values of the mapped bits. That is, for each symbol, the values of a set of bits specify the modulation state according to the modulation scheme.

Alternatively the process of steps S1301 to S1303 may be regarded symbol by symbol, such that a symbol is transmitted when bits have been mapped to all of it bit positions. In any case, a flow of transmitted symbols is produced from an input data flow.

Next, it is checked in S1304 whether a request for retransmission of the transmitted block has been received. This step may be carried out at a later time, that is, the request may be received (for example by a negative acknowledgement message carrying an identifier for the respective block) after several other blocks have been transmitted. If retransmission is requested, a first data bit of the block is selected in step S1305 as current bit to be processed. This does not necessarily have to be the bit having been treated first in S1301 above. The described principle is also applicable when symbols are reordered for retransmission.

In S1306 a decision is made whether the currently processed bit should be retransmitted or not. According to rule (1) it is retransmitted if it has been mapped for the first transmission to a bit position with medium or low reliability. The decision may be made by reading a bit from a lookup table indexed by modulation scheme and a bit position identifier. Alternatively, if S1301 follows a certain order of the mapping, it is also possible to make this decision dependent on the position of the bit in the respective block, that is the decision may follow a certain programmed order for a given modulation scheme. In any case it is made sure that rule (1) is followed.

In S1307, a bit for which retransmission has been decided is mapped to a bit position of the second modulation scheme. If it is decided in S1308 that the block has not been completely processed, steps S1307 to S1308 are repeated for subsequent bits. Finally, analogous to the first transmission, symbols of the second modulation scheme determined by the values of the mapped bits are transmitted in S1310.

Figure 14:
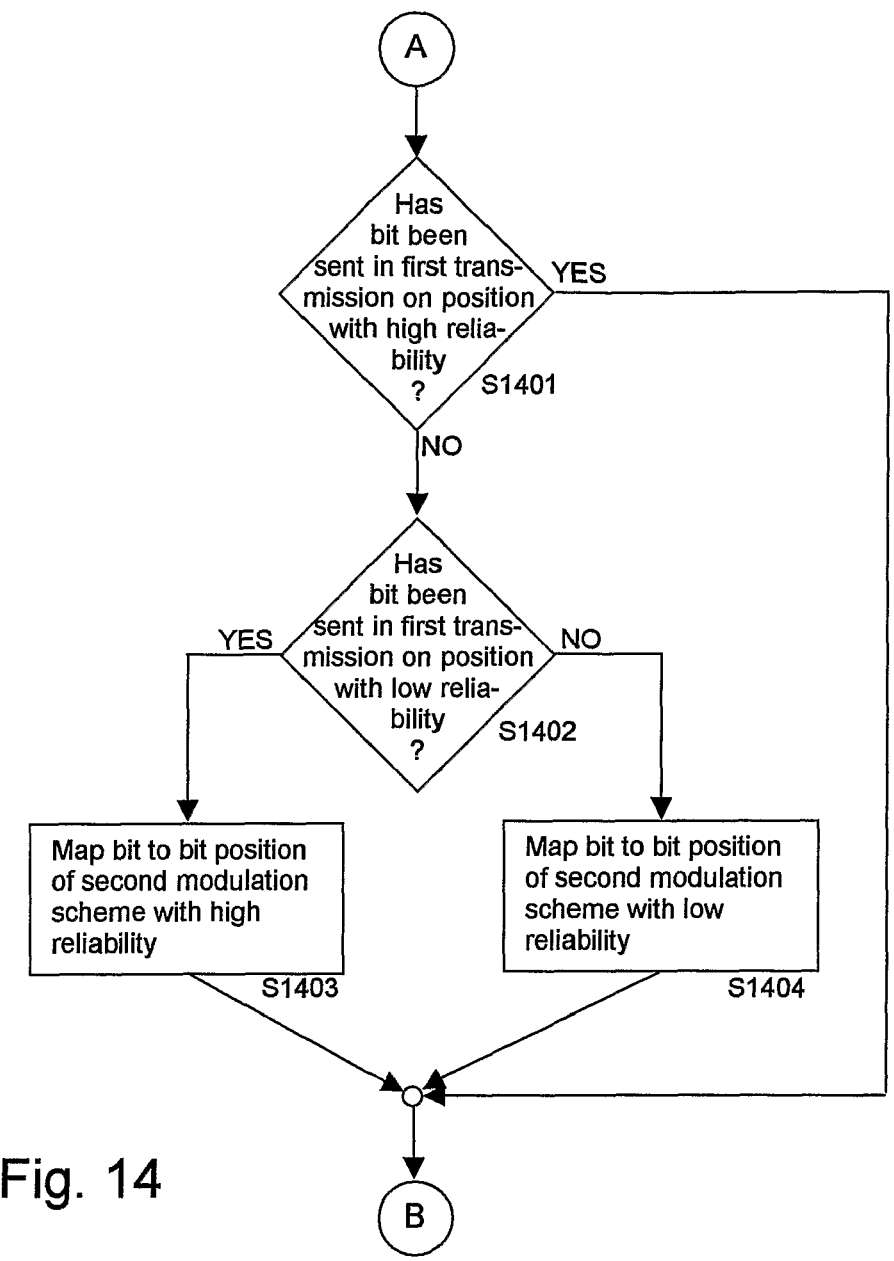
FIG. 14 shows an alternative and more detailed example of the portion between marks A and B in FIG. 13.
Figure 15:
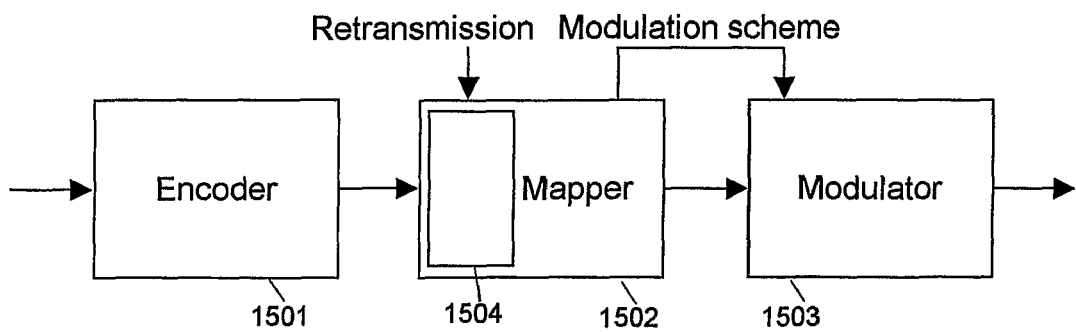
FIG. 15 depicts the basic structure of a transmitter in which the described method may be carried out.

FIG. 14 shows a more detailed alternative for the steps between marks A and B by means of the 64-QAM/16-QAM example given above. The bit positions of 64-QAM can be divided into three groups with three different reliability levels. $i_1$ and $q_1$ have highest reliability, $i_3$ and $q_3$ have lowest reliability.

In S1401 it is checked for the currently processed bit whether it had been transmitted on a bit position with highest reliability ($i_1$ or $q_1$ in the 64-QAM example). If so, it is decided that this bit is not retransmitted and the subsequent steps up to mark B are skipped. If not, it is queried in S1402 whether the bit had been mapped on a position with lowest reliability ($i_3$ or $q_3$ of the 64-QAM). In this case it is mapped in S1403 to one of the reliable positions of the second modulation scheme (i.e. $i_1$ or $q_1$ of the 16-QAM). In the opposite case it is mapped in S1404 to one of the less reliable positions (i.e. $i_2$ or $q_2$ of the 16-QAM). It is clear to a skilled person that this method may be applied in a similar fashion to other combinations of modulation schemes according to the rules given above. Furthermore these decisions may be made by following a certain order of the mapping with both initial transmission and retransmission, as explained further above.

Optionally and additionally the mapping may be defined according to rule (3). In the given example the mapping is such that the value of a bit ($i_2$) having the same value in the outermost half of the columns is "one" in these columns. Consequently the bit (i2) having the same value in the outermost half of the columns of the 16-QAM applied in the retransmission has also the value of "one" in these columns.

FIG. 1500 shows a basic structure of a transmitter in which the described method can be implemented. Data bits are encoded in encoder 1501. encoded bits are passed on to mapper 1502 which passes information about modulation states corresponding to the value combination of mapped bits to modulator 1503 which output a respective transmission signal. Mapper 1502 further receives information about requested retransmission from a control entity like an ARQ unit. This information allows decision means 1504 to decide whether an input bit is to be retransmitted or not and to map the bits to bit positions of a symbol. Additionally, mapper 1502 may inform modulator 1503 about the applied modulation scheme, for example in the case that it is switched between initial transmission and retransmission.

Units 1501 to 1504 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Figure 16:
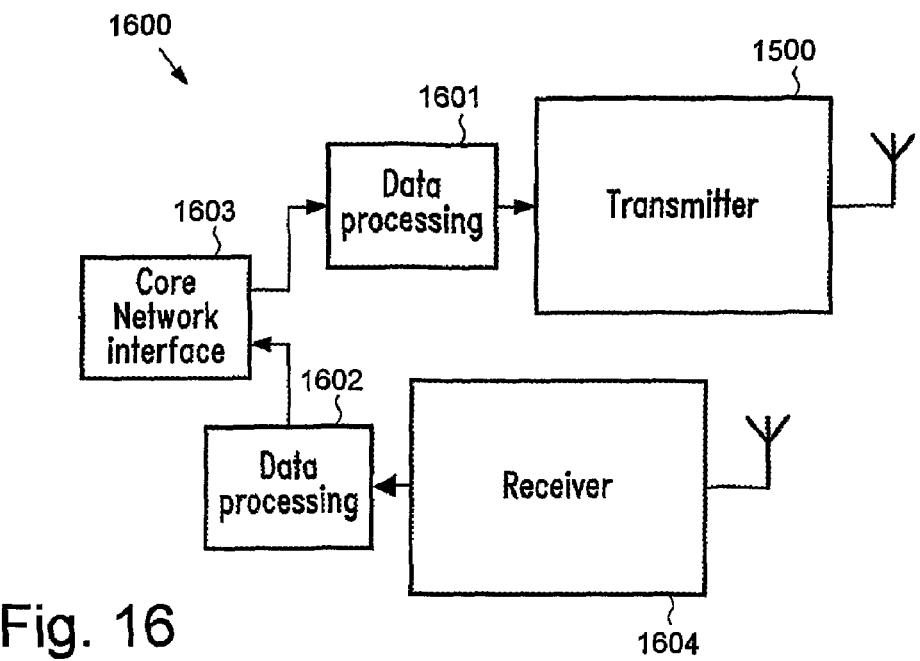
FIG. 16 illustrates an exemplary structure of a base station comprising the transmitter of FIG. 15.

Transmitter 1500 may be part of a base station 1600 as shown in FIG. 16. Such a base station may further comprise data processing units 1601 and 1602, a core network interface 1603 and a corresponding receiver 1604.

Figure 17:
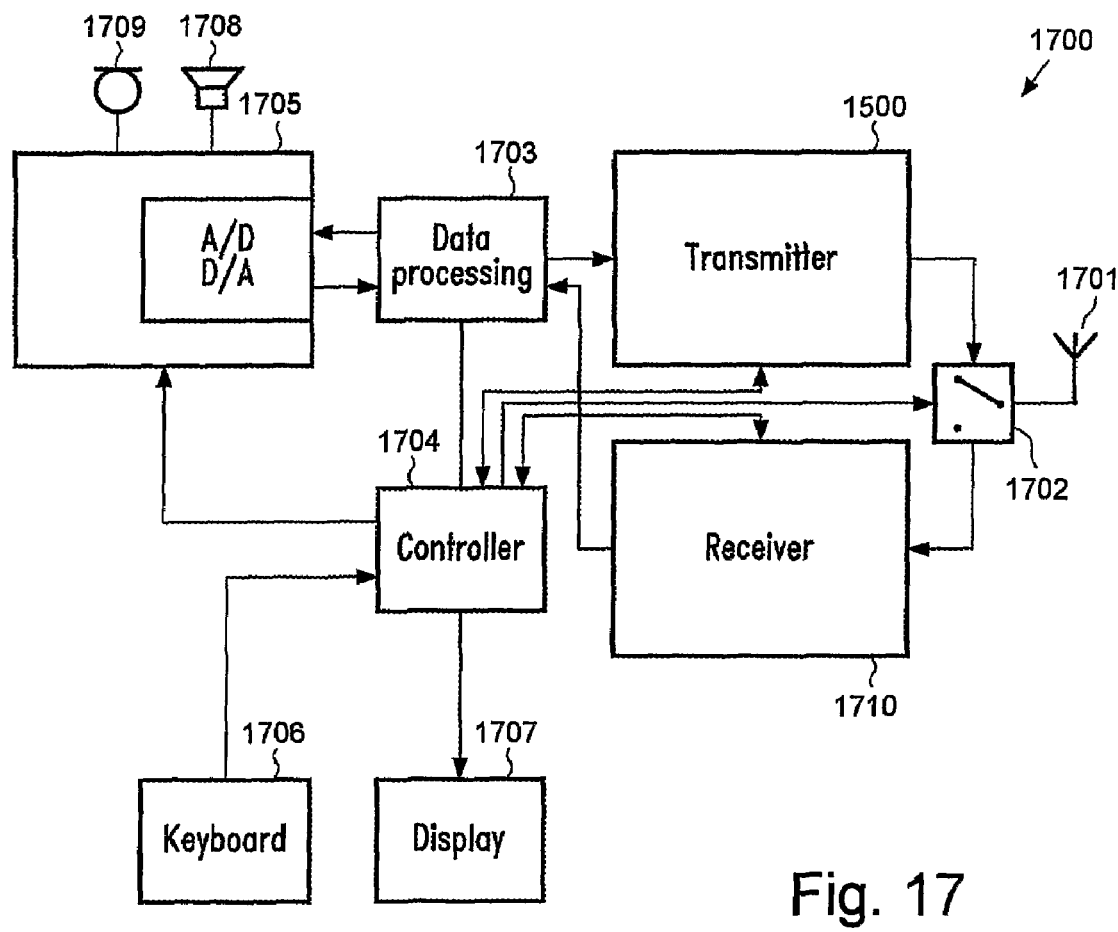
FIG. 17 illustrates the exemplary structure of a mobile station comprising the transmitter of FIG. 15.

A counterpart to base station 1600 might be a mobile station 1700 as shown in FIG. 17. Besides transmitter 1500 and receiver 1710, a mobile station may further comprise antenna 1701, antenna switch 1702, data processing unit 1703 and controller 1704.

Mobile station 1700 might be a mobile phone or a module to be integrated into a portable computer, PDA, vehicle, vending machine or the like. A mobile phone may further comprise mixed signal unit 1705 and a user interface comprising keyboard 1706, display 1707, speaker 1708 and microphone 1709.

The invention claimed is:

1. A method for transmitting a data block consisting of a plurality of bits using higher order modulation schemes, the method comprising:
    mapping each data bit of the data block to a respective bit position of a first modulation symbol according to a first modulation scheme, wherein at least two of the bit positions of the first modulation symbol have different error probabilities,
    transmitting the data block in the first modulation symbol on the mapped bit positions according to the first modulation scheme,
    receiving from a receiver a request for retransmission of the data block,
    deciding for each data bit of the data block whether or not to retransmit the respective data bit based on a reliability of the bit position to which the respective data bit has been mapped in the first modulation symbol,
    mapping data bits, for which it has been decided to perform a retransmission of during the deciding, to respective bit positions of a second modulation symbol according to a second modulation scheme, wherein at least two of the bit positions of the second modulation symbol have different error probabilities, and
    retransmitting the data bits, for which it has been decided to perform the retransmission of during the deciding, in the second modulation symbol on the mapped bit positions according to the second modulation scheme.

2. The method of claim 1, wherein the second modulation scheme differs from the first modulation scheme.

3. The method of claim 2, wherein the second modulation scheme has a lower order than the first modulation scheme.

4. The method of claim 2, wherein the second modulation scheme has a higher order than the first modulation scheme.

5. The method of claim 1, wherein the second modulation symbol contains additional redundancy data.

6. The method of claim 1, wherein a retransmitted data bit of the data block mapped to a bit position in the first modulation symbol having a low reliability is mapped to a bit position in the second modulation symbol having equal or higher reliability in comparison to a retransmitted data bit which has been mapped to a bit position in the first modulation symbol having high reliability.

7. The method of claim 6, wherein:
    the first modulation scheme is a quadrature amplitude modulation with 64 modulation states, 64-QAM, with Gray mapping, and
    the second modulation scheme is a quadrature amplitude modulation with 16 modulation states, 16-QAM, with Gray mapping,
    wherein the deciding for each data bit of the data block whether or not to retransmit the respective data bit comprises:
    deciding to retransmit data bits of the data block transmitted in the first modulation symbol on bit positions with medium or low reliability in the second modulation symbol, and
    deciding not to retransmit data bits transmitted in the first modulation symbol on bit positions with high reliability, and
    the mapping of the data bits, for which it has been decided to perform the retransmission of during the deciding, comprises:
    mapping data bits transmitted in the first modulation symbol on bit positions with low reliability to bit positions with high reliability in the second modulation symbol, and
    mapping data bits transmitted in the first modulation symbol on bit positions with medium reliability to bit positions with low reliability in the second modulation symbol.

8. The method of claim 7, wherein:
    the data bits which have one value for all 64-QAM modulation states of a first half plane and the opposite value for all 64-QAM modulation states of another half plane complementary to the first half plane, are not retransmitted, and
    the mapping of data bits to symbols is such that a value of a data bit, having one value for all modulation states of the outermost half of all rows or columns in the mapping according to the first modulation scheme, in the rows or columns is the same as a value of a data bit, having one value for all modulation states of the outermost half of all rows or columns in the mapping according to the second modulation scheme, in the rows or columns.

9. A non-transitory computer-readable storage medium having stored thereon instructions which, when executed on a processor of a digital data transmitter, cause the transmitter to perform the method of claim 1.

10. A transmitter for transmitting a data block consisting of a plurality of bits in a digital communication system using higher order modulation schemes, the transmitter comprising:
    a mapping unit configured to map each data bit of the data block to a respective bit position of a first modulation symbol according to a first modulation scheme, wherein at least two of the bit positions of the first modulation symbol have different error probabilities,
    a transmitter unit configured to transmit the data block in the first modulation symbol on the mapped bit positions according to the first modulation scheme,
    a receiver unit configured to receive from a receiver a request for retransmission of the data block, and
    a decision unit configured to decide for each data bit of the data block whether or not to retransmit the respective data bit, based on a reliability of the bit position to which the respective data bit has been mapped in the first modulation symbol, wherein the mapping unit is further configured to map data bits, for which the decision unit has decided to perform a retransmission of, to respective bit positions in a second modulation symbol according to a second modulation, and the transmitter unit is further configured to retransmit the data bits, for which the decision unit has decided to perform the retransmission of, in the second modulation symbol on the mapped bit positions according to the second modulation scheme.

11. The transmitter of claim 10, wherein the mapping unit is further configured to map a retransmitted data bit mapped in the first modulation symbol to a bit position with low reliability to a bit position in the second modulation symbol having a higher reliability than a retransmitted bit which has been mapped to a bit position in the first modulation symbol with high reliability.

12. The transmitter of claim 11, wherein:
the first modulation scheme is a quadrature amplitude modulation with 64 modulation states, 64-QAM, with Gray mapping, and
the second modulation scheme is a quadrature amplitude modulation with 16 modulation states, 16-QAM, with Gray mapping, and wherein the decision unit is configured to decide not to retransmit the data bits which have one value for all 64-QAM modulation states of a first half plane and the opposite value for all 64-QAM modulation states of another half plane complementary to the first half plane, and the mapping unit is further configured to map data bits to modulation symbols such that a data bit having one value for all modulation states of the outermost half of all rows or columns in the mapping according to the first modulation scheme has the same value for all modulation states of the outermost half of rows or columns in the mapping according to second modulation scheme.

13. A base station for a mobile communication system, comprising the transmitter according to claim 10.

14. A mobile communication system comprising at least one base station according to claim 13.

15. A mobile station for a mobile communication system, comprising the transmitter according to claim 10.

16. A mobile communication system comprising at least one mobile station according to claim 15.

* * * * *